_United States Patent Office_

3,453,236
Patented July 1, 1969

3,453,236
AROMATIC POLYIMIDEAMIDES PREPARED FROM AROMATIC TETRACARBOXYLIC ACID DIANHYDRIDES AND AMINOAROMATIC HYDRAZIDES
Billy M. Culbertson, Burnsville, Minn., assignor to Ashland Oil & Refining Company, Ashland, Ky., a corporation of Kentucky
No Drawing. Filed Jan. 18, 1967, Ser. No. 610,001
Int. Cl. C08g 20/32
U.S. Cl. 260—47        7 Claims

ABSTRACT OF THE DISCLOSURE

Wholly aromatic polyimideamides thermally stable at temperatures of 500° C. or higher having repeating units of the formula:

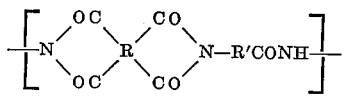

wherein R and R' are aromatic radicals. A process for preparing the polymer by reacting an amino aromatic hydrazide with a tetracarboxylic acid dianhydride followed by dehydrating the reaction product. The polymers of this invention are useful in the formation of thermally stable fibers and films.

---

This invention relates to novel polyimideamides which are wholly aromatic and which have a remarkably high degree of thermal stability.

In the field of synthetic plastics polyamides (or nylons) are widely used because they are tough, thermoplastic materials eminently suitable for the preparation of fibers, films and molded articles. While in many applications polyamides have an acceptable thermal stability, they tend to degrade at temperatures above the melting point, i.e. in the vicinity of 250°–260° C. Recent research indicates that polyimides, have an exceedingly high degree of thermal stability but do not have the toughness and moldability exhibited by polyamides. It has now been found that a combination of the best properties of these two materials is found in a novel polymer having a backbone of alternating segments of aromatic imides and aromatic amides.

It is an object of this invention to provide a novel polyimideamide as a composition of matter.

It is another object of this invention to provide a novel polymeric composition of matter having an exceedingly high degree of thermal stability.

It is another object of this invention to provide a moldable plastic which has alternating imide and amide groups along the polymer chain and has a high degree of thermal stability.

It is still another object of this invention to provide a process for preparing the polyimideamide mentioned above.

Still other objects will be apparent from the more detailed description of this invention which follows.

The novel polyimideamides in this invention have repeating units of the formula:

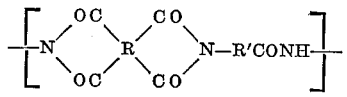

wherein R is a tetravalent aromatic radical containing at least one ring of six carbon atoms and characterized by benzenoid unsaturation, the four carbonyl groups being attached directly and separately to two pairs of adjacent carbon atoms of said ring, and R' is a divalent radical of an aromatic or heteroaromatic cyclic structure. In preferred embodiments of this invention R is a tetravalent radical derived from an aromatic structure such as benzene, naphthalene, biphenyl, benzophenone, or the like. In other preferred embodiments of this invention R' is a divalent radical of an aromatic or heteroaromatic cyclic structure such as benzene, biphenyl, naphthalene, anthracene, quinoline, quinoxaline, acridine, phenazine, phenothiazine, benzothiazole, benzoxazole, benzimidazole, benzopyrrole, benzothiophene, benzofuran, carbazole, or the like.

The polyimidemides of this invention are prepared by reacting (1) an amino aromatic hydrazide having the formula:

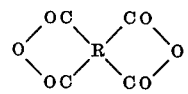

wherein R' is an aromatic or heteroaromatic cyclic structure with (2) an aromatic tetracarboxylic acid dianhydride of the formula:

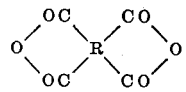

wherein R is a tetravalent aromatic radical containing at least one ring of six carbon atoms and characterized by benzenoid unsaturation, the four carbonyl groups being attached directly and separately to two pairs of adjacent carbon atoms of said ring. This forms a first reaction product, which is then cyclodehydrated to form the polyimideamide of this invention. In preferred embodiments of this invention the process is carried out with the hydrazide and the dianhydride in solution in one solvent or a mixture of solvents at a temperature of 25°–50° C.

The nucleus R in the above formula is the residue of an aromatic tetracarboxylic acid dianhydride. Each of the four available bonds of the radical is connected to a carbonyl group, and the carbonyl groups are arranged in two pairs, normally positioned on opposite sides of the aromatic nucleus. The two carbonyl groups in any one pair are connected to adjacent carbon atoms of the ring nucleus.

The radical R in the above formula may be a monocyclic structure, a fused ring structure or a heteroaromatic structure in which an aromatic ring is fused to a heterocyclic structure. Therefore, the radical may be thought of as a derivative of compunds such as benzene, naphthalene, biphenyl, anthracene, acridine, carbazole, bridged structures such as benzophenone, diphenyloxide, diphenylsulfide, and the like. These structures may be substituted with noninterfering substituents such as lower alkyl, lower alkoxy, halogen, nitro, amino, and others which do not interfere with the principal reactions nor with the dehydration procedures for preparing the polyimideamides therefrom. Among the preferred radicals which may be employed for this purpose are those having the following structural formulas:

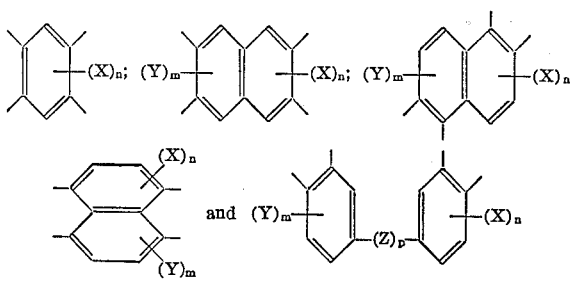

wherein X and Y are noninterfering substituents, $m$ and $n$ have values of 0, 1 or 2, Z is a divalent alkylene radical of 1-3 carbon atoms, —CO—, —O—, —S—, —NH—, or —SO$_2$—, and $p$ has the value of 0 or 1.

The portion of the polymer formula represented by R' is a divalent radical of an aromatic or heteroaromatic cyclic structure. Therefore this radical may be derived from a carbocyclic aromatic ring or fused ring, from a heterocyclic aromatic ring, or from a fused ring system comprising a carbocyclic aromatic ring and a heterocyclic ring which is either aromatic or nonaromatic. Although there are many types of heteroatoms which are operable in this invention, the more common ones are preferred, i.e. oxygen, nitrogen, or sulfur. The aromatic character of the radical is determined by the presence of an electronic structure which has certain similarities to benzene, or other common aromatic compounds. The generally accepted theories of chemistry today relate aromatic character to the presence of pi electrons, which in turn, produce a resonance in the cyclic structure that resembles to some extent the resonance found in benzene. Thus, many heterocyclic structures which do not have the conjugated unsaturation of benzene, and therefore, do not have the highly aromatic character of benzene, are nevertheless considered to be aromatic compounds. In the description of this invention it is considered that a heterocyclic structure which has at least one unsaturated linkage in the cyclic nucleus is heteroaromatic.

The preferred radicals for R' are those derived from structures such as benzene, biphenyl, naphthalene, anthracene, quinoline, quinoxaline, acridine, phenazine, phenothiazine, benzothiazole, benzoxazole, benzimidazole, benzopyrrole, benzothiaphene, benzofuran, carbazole, and substitution products of said cyclic structures where the substituent is a noninterfering group.

The polymers of this invention are characterized by having a desirable combination of thermal stability and moldability. The thermal stability of these polymers is such that substantially no degradation occurs when the polymer is heated in air at temperatures below about 400° C. and only a minor amount of degradation occurs at temperatures up to 500° C. When the degradation is measured in nitrogen the polymer may be heated to 800° C. and exhibit a weight loss not greater than about 50% in two hours. Not only does the polymer have this desirably high thermal stability, but it also is fabricable into fibers, filaments, films and shaped articles by the normal techniques of casting, spinning, extruding, molding, and the like.

In the process of this invention an aromatic tetracarboxylic acid dianhydride is reacted with an amino aromatic hydrazide to produce a first reaction product. While it is not intended that this invention be limited to any particular first reaction product it is believed that a polymer having amide linkages and branched carboxylic acid groups is formed having the formula:

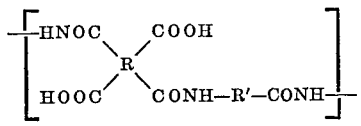

wherein R and R' have the foregoing definitions. This first reaction product is then cyclodehydrated, by heat or the equivalent, to produce the polyimideamide described previously.

The reaction may be carried out in any suitable system, although it is preferred to employ a solution polymerization system wherein the two reactants are dissolved in one or more suitable liquid solvents. If more than one solvent is employed, they should be miscible so that the two reactants are free to contact each other. Generally any polar organic solvent having functional groups which do not react with amine, hydrazine, or anhydride functionalities at the polymerization conditions is suitable for use in the invention. Among the preferred solvents are N,N-dialkylcarboxylamides of aliphatic acids, e.g. dimethylformamide, dimethylacetamide, and the like; tetramethylurea; dimethylsulfoxide; N-methyl-2-pyrrolidone; pyridine; dimethylsulfone; hexamethylphosphoramide; tetramethylenesulphone; and mixtures of these materials.

The reaction temperature is in the vicinity of 25°–50° C. At temperatures above 50° C. imide formation begins to occur, and as the temperature is increased still further the rate of imide formation increases proportionately. At temperatures much below 25° C. the rate of reaction in slower than is desirable. No other special processing conditions are required. The pressure may be atmospheric, subatmospheric or superatmospheric. The reaction time is determined by the rate of addition of the reactants.

The relative proportions of hydrazine and dianhydride should be controlled to approximate the stoichiometry of the reaction in order to assure that the product polymers are high in molecular weight. Furthermore, if the anhydride is present in a substantial excess it has a tendency to degrade the polymer in solution.

The concentration of solute and solvent in the reaction medium is not critical, permitting a wide range of proportions to be employed for the polymerization. The principal factor determining these proportions is the viscosity of the solution, and its effect upon pumping requirements, reaction time, etc. A preferred ratio of solute to solvent is about 10%–25% by weight.

The hydrazide reactant is amino aromatic hydrazide. As has been explained above the aromatic radical which forms the nucleus for this reactant may be a carbocyclic ring system, a heterocyclic ring system, a fused ring system combining carbocyclic rings, or a fused ring system combining a carbocyclic ring with a heterocyclic ring. Examples of suitable amino aromatic hydrazides include 2-aminobenzoyl hydrazide,
3-aminobenzoyl hydrazide,
4-aminobenzoyl hydrazide,
3-amino-4-methoxybenzoyl hydrazide,
3,5-dichloro-4-aminobenzoyl hydrazide,
1-amino-4-naphthoyl hydrazide,
1-amino-5-naphthoyl hydrazide,
1-amino-7-naphthoyl hydrazide,
1-amino-2,8-dichloro-7-naphthoyl hydrazide,
4-amino-4'-carboxyl-biphenyl hydrazide,
3,5-dimethoxy-4-amino-4'-carboxyl-biphenyl hydrazide,
4a-amino-4'-carboxyl-diphenylether hydrazide,
4-amino-4'-carboxyl-diphenylsulfiide hydrazide,
4-amino-4'-carboxyl-benzophenone hydrazide,
1-amino-7-carboxyl-anthracene hydrazide,
3-amino-6-carboxyl-quinoline hydrazide,
2-amino-6-carboxyl-quinoxaline hydrazide,
2-amino-7-carboxyl acridine hydrazide,
2-amino-7-carboxyl-phenazine hydrazide,
2-amino-7-carboxyl-phenothiazine hydrazide,
2-carboxyl-5-amino-benzothiazole hydrazide,
2-carboxyl-6-amino-benzoxazole hydrazide,
2-carboxyl-6-amino-benzimidazole hydrazide,
2-carboxyl-6-amino-benzopyrrole hydrazide,
2-carboxyl-6-amino-benzothiophene hydrazide,
2-carboxyl-6-benzofuran hydrazide,
2-amino-7-carboxyl-carbazole hydrazide, and the like. It is to be understood that position isomers as well as related substituted products in which the substituents are noninterfering are to be included within the scope of this invention. Among the noninterferring substitutents are lower alkyl, lower alkoxy, nitro, sulfonyl, chloro, bromo, iodo, fluoro, lower alkyl ester, and the like.

The other reactant is an aromatic tetracarboxylic acid dianhydride. In general any dianhydride which contains an aromatic structure, in the sense of having at least one ring of six carbon atoms with benzenoid unsaturation, may be suitably employed in this invention. The aromatic ring structure may comprise a single ring such as benzene or fused rings such as naphthalene or perylene. The carbonyl groups of the anhydrides are attached to the ring structure in pairs such that the carbonyl groups in each pair are attached to adjacent ring carbon atoms. There should be at least one ring carbon atom between the pairs of carbon atoms which carry the carbonyl groups, and preferably the pairs are on opposite sides of the ring structure in a symmetrical arrangement. Among the dianhydrides which may be employed in this invention are:

pyromellitic dianhydride;
1,2,3,4-benzene tetracarboxylic dianhydride;
1,2,4,5-napthalene tetracarboxylic dianhydride;
1,2,5,6-naphthalene tetracarboxylic dianhydride;
1,4,5,8-naphthalene tetracarboxylic dianhydride;
2,3,6,7-naphthalene tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
2,2',3,3'-biphenyl tetracarboxylic dianhydride;
3,3',4,4'-biphenyl tetracarboxylic dianhydride;
3,3',4,4'-benzophenone tetracarboxylic dianhydride;
bis(3,4-dicarboxyphenyl) sulfone dianhydride;
bis(3,4-dicarboxyphenyl) sulfiide dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
2,2-bis(2,3-dicarboxyphenyl) propane dianhydride;
1,8,9,10-phenanthrene tetracarboxylic dianhydride; and
3, 4, 9, 10-perylene tetracarboxylic dianhydride.

This invention may be more readily understood by reference to the following examples. Parts and percentages are by weight and temperatures are in degrees centigrade unless otherwise specified. Inherent viscosity is determined in a solution at 25° C. at a concentration of 0.5 g. of polymer per 100 ml. of solvent.

EXAMPLE 1

Under a nitrogen atmosphere, 7.55 g. of p-aminobenzoyl hydrazide was dissolved in 125 g. of N,N-dimethylformamide. To this solution, with stirring, 16.10 g. of benzophenone tetracarboxylic acid dianhydride was added. The beaker that had contained the anhydride was washed several times with dimethyl formamide and the washings (ca. 25 g.) were also added to the reaction pot. The solution temperature during the reaction rose from 25° C. to 38° C. and the solution became quite viscous. The solution was stirred at room temperature for 2 hours, and was then poured directly onto glass plates, air dried at room temperature, and dried in a force oven for several hours at 50° C.–75° C. to give clear, tough films. Another portion of the polymer solution was quenched by pouring into water. The separated polyamide was filtered, washed with water, and dried under vacuum at about 60° C. The yield was essentially quantitative and the inherent viscosity was 0.48 in dimethylsulfoxide solution. The polyamide decomposed at 460° C.–470° C. The polyamide was soluble in N,N-dimethylacetamide, dimethylsulfoxide, N-methylpyrrolidone, and aqueous basic solutions. When the alkaline solution of the polymer was acidfied with mineral acid, the polyamide precipitated immediately. Infrared spectra studies and elemental analysis were in agreement with the theory that the polymer had the following repeating unit:

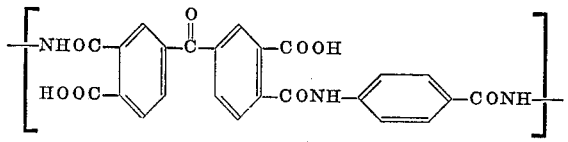

When the polyamide films were heated in an oven at 150°–250° C., and in vacuo (2–3 mm. Hg) at 150°–250° C. the polymer was dehydrated. Dehydration was followed by cyclization to form imide rings along the polymer chain and a polyimideamide of high molecular weight having repeating units of the formula:

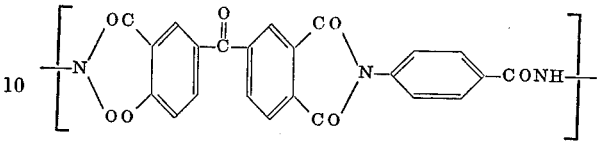

Infrared spectra changes and elemental analysis confirmed the above structural formula. The polyimideamide thus obtained was insoluble in polar solvents and in cold concentrated sulfuric acid.

The thermal stability of the polyimideamide was measured in both nitrogen and air by differential thermal analysis and thermogravimetric analysis techniques. Decomposition started about 400° C. in both air and nitrogen. When heated to 800° C. in a nitrogen atmosphere, the weight loss was about 50% for 2 hours.

EXAMPLE 2

Using the same experimental technique as in Example 1, 7.55 g. of p-aminobenzoyl hydrazide was reacted with 10.90 g. of pyromellitic dianhydride in 150 g. of N,N-dimethylformamide. In like manner, the DMF solution was used to cast excellent films on glass plates. After isolation, as in Example 1, the polymer was found to have an inherent viscosity of 0.52 in dimethylsulfoxide solvent. The polymer, both before and after cyclohedydration, exhibited comparable thermal stabilities to those reported in Example 1. The cyclodehydrated polymer in accordance with infrared and elemental analysis studies, had the following structure:

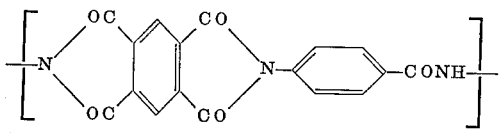

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A film and fiber forming polyimideamides consisting essentially of repeating units of the formula:

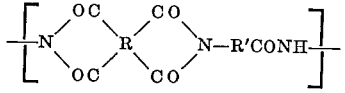

wherein R is a tetravalent aromatic radical containing at least one ring of six carbon atoms and characterized by benzenoid unsaturation, the four carbonyl groups being attached directly and separately to two pairs of adjacent carbon atoms of said ring, and R' is a divalent radical of a carbocyclic aromatic or heteroaromatic cyclic structure.

2. A film and fiber forming polyimideamide of claim 1 wherein R is a tetravalent radical selected from the group consisting of:

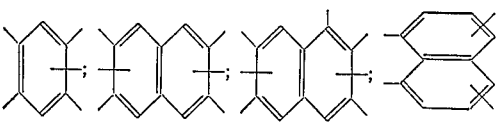

and

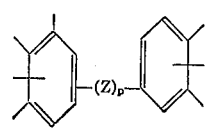

wherein Z is a divalent alkylene radical of 1–3 carbon atoms, —CO—, —O—, —S—, —NH—, or —SO$_2$—, and $p$ has the value of 0 or 1.

3. A film and fiber forming polyimideamide of claim 1 wherein R' is a divalent radical of a carboycylic aromatic or heteroaromatic cyclic structure selected from the group consisting of benzene, biphenyl, napthalene, anthracene, quinoline, quinoxaline, acridine, phenazine, phenothiazine, benzothiazole, benzoxazole, benzimidazole, benzopyrrole, benzothiophene, benzofuran, and carbazole.

4. A process for preparing a polyimideamide of claim 1 comprising reacting an aminoaromatic hydrazide of the formula:

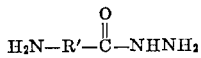

wherein R' is a carbocyclic aromatic or heteroaromatic cyclic structure with an aromatic tetracarboxylic acid dianhydride of the formula:

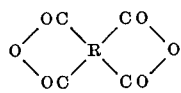

wherein R is a tetravalent aromatic radical containing at least one ring of six carbon atoms and characterized by benzenoid unsaturation, the four carbonyl groups being attached directly to separate ring carbon atoms arranged as two pairs of adjacent carbon atoms, to form a first reaction product, and cyclodehydrating said first reaction product at a temperature above 50° C. to form the polyimideamide of claim 1.

5. The process of claim 4 wherein the reaction between the said hydrazide and the said dianhydride is carried out in a suitable solvent or mixture of solvents for the reactants at a temperature of 25°–50° C.

6. The process of claim 4 wherein said hydrazide is one in which R' is a divalent radical of a carbocyclic aromatic or heteroaromatic cyclic structure selected from the groups consisting of benzene, biphenyl, naphthalene, anthracene, quinoline, quinoxaline, acridine, phenazine, phenothiazine, benzothiazole, benzoxazole, benzimidazole, benzopyrrole, benzothiophene, benzofuran, and carbazole.

7. The process of claim 4 wherein said dianhydride is one in which R is a tetravalent radical selected from the group consisting of:

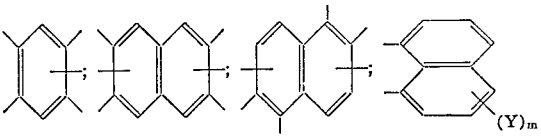

and

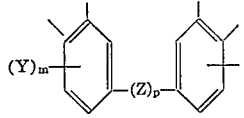

wherein Z is a divalent alkylene radical of 1–3 carbon atoms, —CO—, —O—, —S—, —NH—, or —SO$_2$—, and $p$ has the value of 0 or 1.

References Cited
UNITED STATES PATENTS

| | | | |
|---|---|---|---|
| 3,179,635 | 4/1965 | Frost et al. | 260—78 |
| 3,260,691 | 6/1966 | Lavin et al. | 260—30.2 |
| 3,360,502 | 12/1967 | Loncrini | 260—78 |

HAROLD D. ANDERSON, *Primary Examiner.*

L. L. LEE, *Assistant Examiner.*

U.S. Cl. X.R.

260—65, 78, 326, 308, 302, 292, 306